Figure 1:
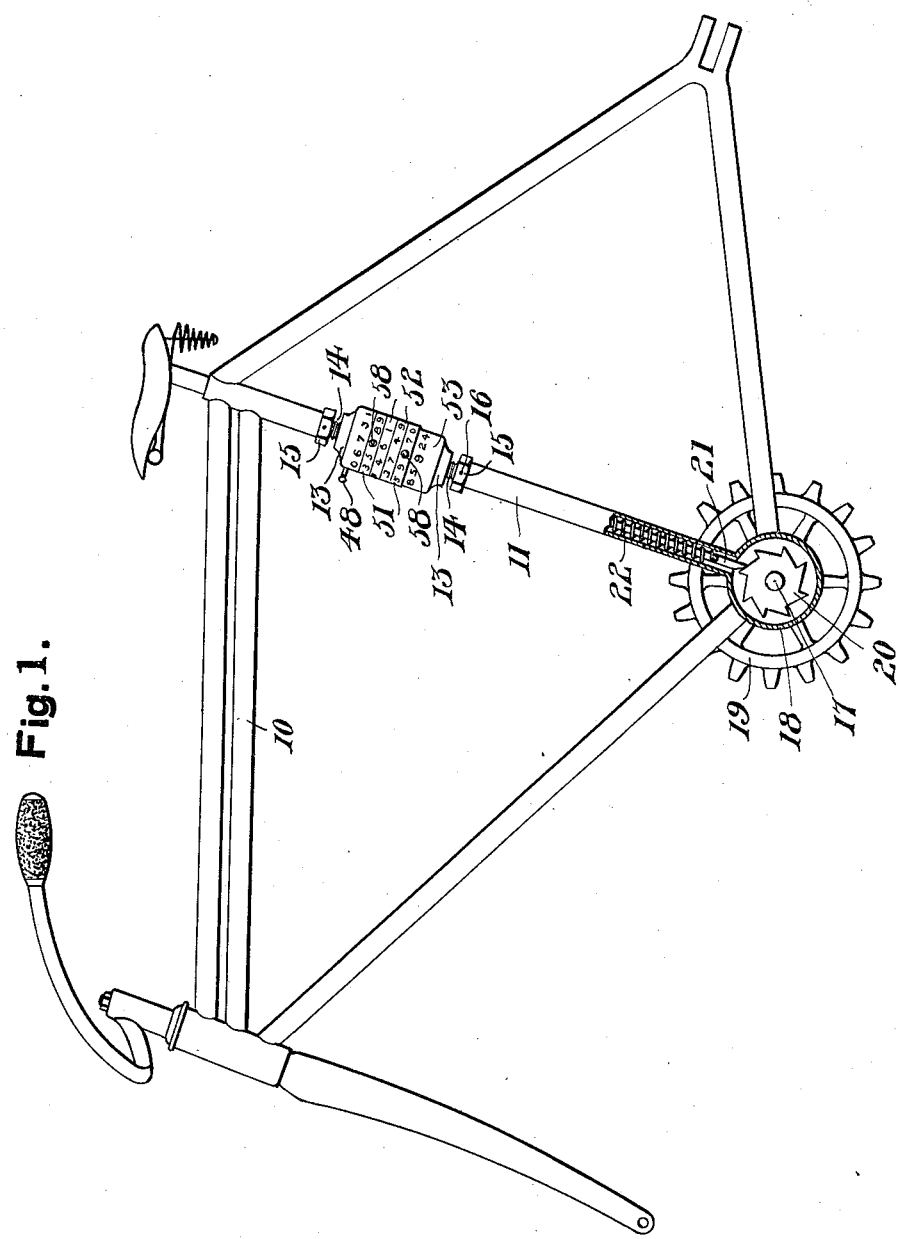

A. LEKSUCZIN.
PERMUTATION LOCK.
APPLICATION FILED DEC. 12, 1914.

1,140,751.

Patented May 25, 1915
3 SHEETS—SHEET 1.

Witnesses

Inventor
A. Leksuczin

By A. M. Wilson
Attorney

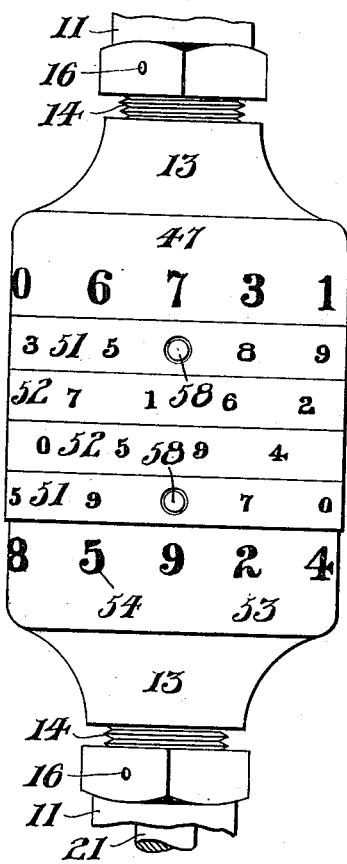
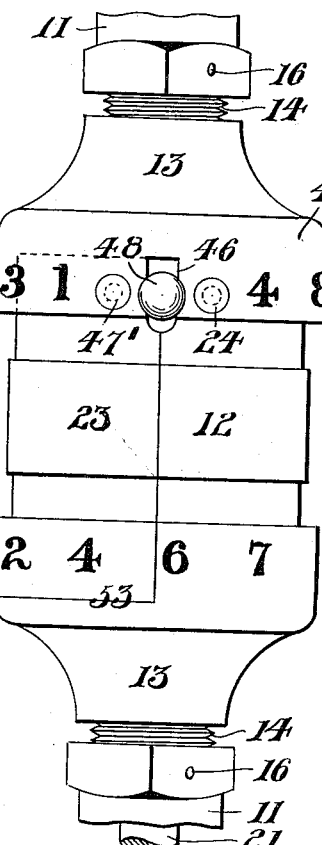
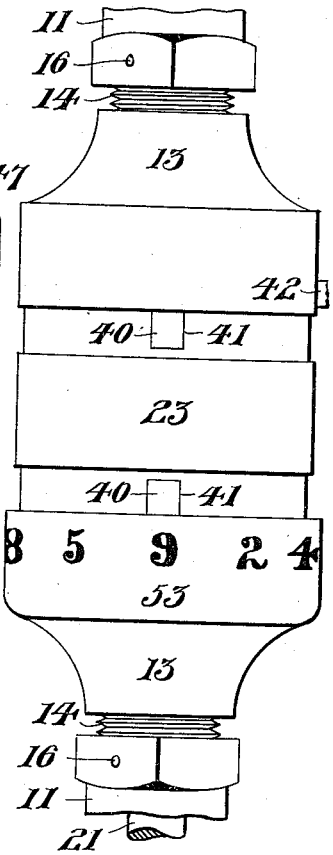
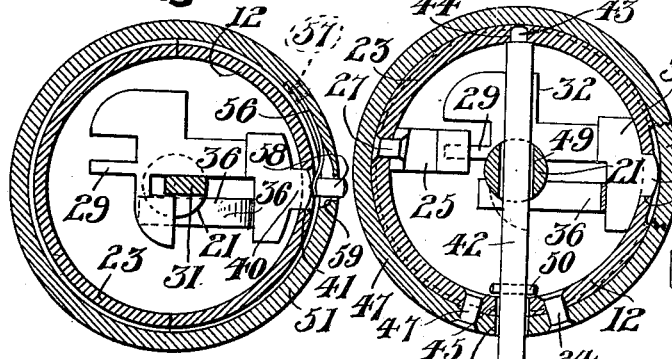
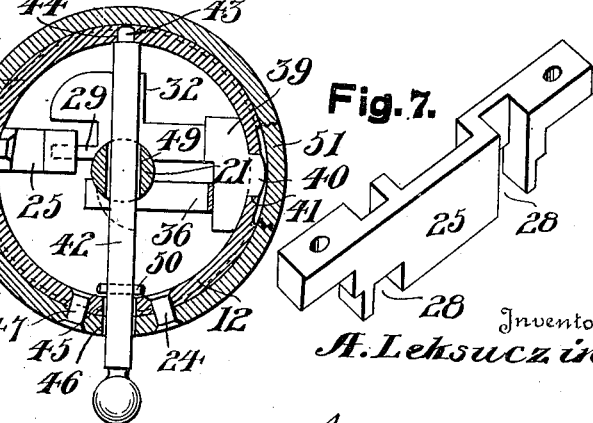

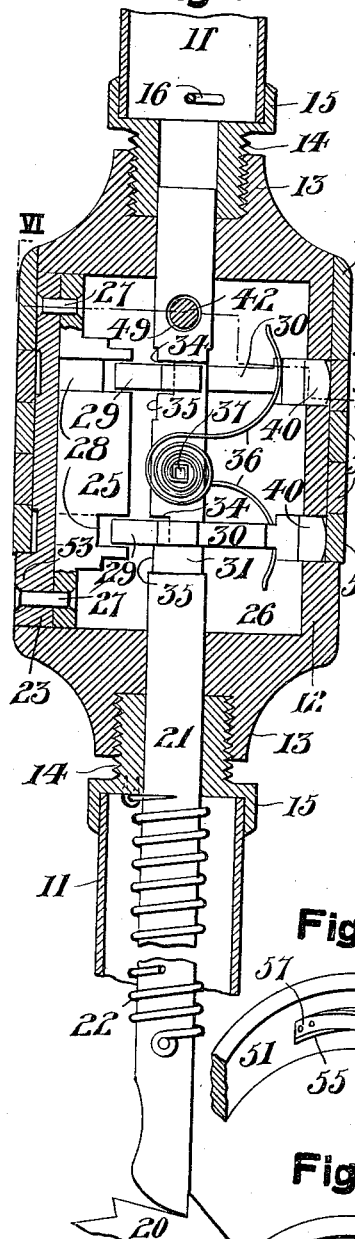

UNITED STATES PATENT OFFICE.

ALEXANDER LEKSUCZIN, OF DETROIT, MICHIGAN.

PERMUTATION-LOCK.

1,140,751.

Specification of Letters Patent. Patented May 25, 1915.

Application filed December 12, 1914. Serial No. 876,905.

*To all whom it may concern:*

Be it known that I, ALEXANDER LEKSUCZIN, a citizen of the United States, residing at Detroit, in the county of Wayne and State of Michigan, have invented certain new and useful Improvements in Permutation-Locks, of which the following is a specification.

This invention relates to certain new and useful improvements in permutation locks.
The primary object of the invention is to provide a permutation lock particularly adapted for use in connection with a bicycle or like vehicle and having permutation locking means engageable for preventing movement of the propelling means of such vehicle.

A further object of the device is to provide a locking bolt engageable with a member for preventing the operation of such member, such bolt being controlled by a permutation lock mounted adjacent the member.

With these general objects in view and others that will appear as the nature of the invention is better understood, the same consists in the novel combination and arrangement of parts to be hereinafter more fully described, illustrated in the accompanying drawings and set forth in the appended claims.

In the drawings forming a part of this application and in which like-designating characters refer to corresponding parts throughout the several views, Figure 1 is a side elevation of a bicycle frame provided with the present device and partially shown in section. Fig. 2 is an enlarged side view of the permutation lock in position to be actuated for releasing the bolt. Fig. 3 is a side view of the same with the permutation rings removed and taken at an angle of 90 degrees from the point of view shown in Fig. 2. Fig. 4 is a view similar to Fig. 2 but with the permutation rings and cap removed. Fig. 5 is a transverse sectional view taken upon line V—V of Fig. 9. Fig. 6 is a transverse sectional view taken upon line VI—VI of Fig. 8. Fig. 7 is a perspective view of the guard plate. Fig. 8 is a central longitudinal sectional view through the lock with portions of the bicycle frame, the lock bolt being broken away and the elements positioned as found when the device is locked. Fig. 9 is a similar view partly in elevation with the elements in their unlocked position. Fig. 10 is a perspective view of one of the locking tumblers. Fig. 11 is a similar view of the other tumbler. Fig. 12 is a perspective view of a portion of the locking bolt.
Fig. 13 is a perspective view of a portion of one of the permutation rings showing the tumbler releasing means, and Fig. 14 is a perspective of the upper portion of the removable side of the lock casing.

Referring more in detail to the drawings a bicycle frame 10 is herein illustrated having the present invention installed upon the central tubular brace or frame member 11. The lock is provided with a tubular casing 12 having tapered ends 13 in which are screw-threaded union caps 14 which caps are provided with sockets 15 adapted for the reception of the adjacent portions of the frame tubing 11 in which manner the casing forms a part of the frame member 11, the said caps 14 being also secured to the tubing ends by rivets 16.

The crank shaft 17 of the bicycle extends through the sleeve 18 and is provided with a sprocket wheel 19 in the usual manner but also has a toothed wheel 20 centrally positioned thereon and in direct alinement with the longitudinal axis of the frame tube 11 and is adapted to be engaged by a sliding bolt 21 in the form of a rod which is positioned through the tubing 11, the lock casing and the caps 14, being slidably journaled in the said casing and caps. A coil spring 22 encircles the bolt 21 and normally holds the same in its unlocked retracted position.

The casing 12 is provided with a removable side 23 which forms substantially one-half of the tubular casing wall whereby the lock-mechanism is positioned within the casing while said removable side is secured in position by means of a rivet 47′ and the ring cap 47 hereinafter described.

A guard plate 25 is secured longitudinally within the chamber 26 of the casing by means of rivets 27, and is provided with notches 28 upon its opposite side and adjacent its ends for the sliding reception of the projecting lugs 29 carried by the tumblers 30 which are of substantially identical form and one of which is best illustrated in Fig. 10. The bolt 21 has a flattened portion 31 spaced from its upper end and the tumblers are adapted to ride over the said flattened portion while the bolt slides through the cut-away portion 32 of the tumblers, the flattened portion of the bolt being adapted to seat within the notches 33 of the tumblers. One side edge of the flattened portion is provided with two deep-notches 34 adapted to receive the tumbler notches 33 when the tumblers and bolt are positioned locked while the tumblers rest upon the shallower notched portions 35 of the flattened bolt portion when the bolt is retracted in its unlocked position. Similar leaf springs 36 are carried by lugs 37 upon the opposite sides of the flattened portions 31 and said springs engage the faces 38 of the bases 39 of the tumblers. The tumblers are each provided with a projection 40 upon its base which is adapted to project through slots 41 in the casing wall while a forcing of said tumblers is effected for releasing the bolt by means of pressure exerted upon the outer end of the said extensions 40 and through the agency of releasing means carried by the permutation rings in a manner hereinafter set forth.

A releasing latch 42 is movably positioned transversely of the casing having one end reduced as at 43 and loosely pivoted in a recess 44 at one side of the casing while the opposite end of the latch extends through a longitudinal slot 45 in the opposite side of the casing and also through a similar slot 46 in a permutation cap 47, which cap is mounted upon the upper end of the casing and is retained thereon by means of the rivet 47′ and a similar rivet 24 passing through the casing 12. The latch 42 is provided with a terminal knob 48 exteriorly of the casing end, and the latch being freely extended through a transverse perforation 49 of the bolt 21, it will be seen that when the tumblers are released from their engagement with the bolt, a downward movement of the knob 48 will lower the bolt to its locked position against the normal action of the spring 22 which will be extended and placed under tension. A transverse pin 50 is carried by the latch 42 interiorly of the casing which prevents the latch from being removed therefrom.

Two outer and two inner permutation rings 51 and 52 respectively are journaled for turning upon the exterior cylindrical surface of the casing and between the ring cap 47 and the annular ring 53 of the casing. The ring cap 47 and the ring 43 as well as each of the journaled rings are provided with any desired arrangement of numbers as 54 for providing combination numbers by which the lock may be operated.

The inner rings 52 perform no function in the bolt releasing operation but are for the purpose of acting as a "blind" to confuse unauthorized persons from attempting to operate the permutation lock by means of a combination of the numbers disclosed thereon. Each of the outer rings 51 is provided with a longitudinal socket 55 on its inner face in which a leaf spring 56 is positioned being secured to the ring at one end 57 thereof and provided with a push pin 58 at its other end which projects through an opening 59 in the ring whereby the spring 56 may be pushed inwardly to engage the outer end of the adjacent tumbler extension 40 when the carrying ring is accurately positioned with the pin end of the spring directly thereover as illustrated in Figs. 5 and 9.

When the bolt is projected in its locked position as illustrated in Fig. 8, the tumblers are engaged in the deeper notches 34 of the bolt and prevent a longitudinal movement thereof, while the extensions 40 lie within the openings 41 and have their outer faces substantially flush with the outer periphery of the casing while the outer rings 51 are adapted to be turned directly over the ends of said extensions. When desired to release the bolt by retracting the same, the outer rings 51 are turned to the required position which in the present manner of arrangement as illustrated in Fig. 2 consists of positioning the push pins 58 in direct alinement between the upper number 7 and the lower number 9. When so positioned, the pins 58 may be both pressed inwardly thus moving the tumblers inwardly and releasing them from engagement with the notches of the bolt which allows the spring 22 to retract the bolt and hold the same out of engagement with the teeth of the toothed wheel 20. The rings 52 and 51 may be then turned to any position desired and the lock is adapted to be again placed in its locking position by a downward movement upon the latch knob 48, the springs 36 forcing the projecting lug 29 into engagement with the deeper notches 34 of the bolt when the bolt is in its locked position as shown in Fig. 8.

The complete operation of the device will thus be apparent, it being seen that when the toothed wheel 20 is prevented from turning by a locking of the bolt, the bicycle cannot be operated, but when the bolt is released all obstruction to the operation thereof is removed.

While the form of the invention herein shown and described is what is believed to be the preferred embodiments thereof, it is nevertheless to be understood that minor changes may be made without departing from the spirit and scope of the invention as claimed.

What I claim is: —

1. A lock comprising a tubular casing, a bolt slidably positioned longitudinally through said casing and provided with a flattened portion having notches therein, spring-pressed tumblers transversely slidable within said casing and seated within said notches when the bolt is projected, a retracting spring for said bolt, and permutation disengaging means for the said tumblers.

2. A lock comprising a tubular casing having side openings and a side slot therein, a bolt slidably positioned through the said casing and having a flattened portion provided with notches, a retracting spring for said bolt, transversely slidable tumblers positioned within said casing and engaging said notches when the bolt is in its locked position, extensions upon said tumblers positioned within said openings of the casing, permutation shifting means for the said tumblers and a projecting latch pivoted within the said casing and engaging said bolt and extending through said casing slot.

3. A lock comprising a tubular casing, having side openings, a normally resiliently retracted bolt slidably mounted through said casing and having a flattened portion within said casing, a guard plate longitudinally secured within the said casing, tumblers transversely slidable within said casing and spanning said bolt and positioned within said guard plate and openings, expansion springs carried by opposite sides of the bolt and engaging the said tumblers and permutation means upon said casing engageable with the said tumblers.

4. A lock comprising casing, a normally retracted bolt slidably mounted in said casing, engaging tumblers for said bolt transversely slidable within the said casing, permutation actuating means for said tumblers peripherally carried by the said casing, the said bolt provided with a transverse opening at a point within said casing, the said casing having a side slot therethrough and an inner socket therein, a latch extending transversely through the said casing and said bolt opening and having its inner end pivoted in said socket and its outer end slidably projecting through the said slot and a transverse stop pin carried by said latch interiorly of said casing.

5. A lock comprising a tubular casing having side openings, a side slot and an internal socket therein, a removable cap ring at the top of said casing, a similar integral ring at the bottom of said casing, outer and inner rings journaled upon said casing between the said outer and inner ring, a bolt slidably positioned through the said casing, bolt-engaging tumblers within said casing and projecting into the said casing openings, shiftable pins carried by said outer ring and positionable in alinement with said casing openings, a latch extending within said casing in engagement with the said bolt and having its inner end pivoted within said socket and its outer end projecting through the said slot.

6. A lock comprising a tubular casing having an annular integral ring adjacent the bottom thereof, and also having a removable side section and openings positioned opposite the said section, a cap ring adjacent the other end of said casing, a guard plate carried by the inner face of said removable section and having guideways therein, a bolt slidably mounted through said casing, tumblers transversely slidable within said casing and within said guide-ways and openings, normally projecting means for said tumblers, and permutation actuating means for said tumblers carried by said casing and over the said openings.

7. A lock comprising a tubular casing having an annular integral ring adjacent the bottom thereof, and also having a removable side section and openings positioned opposite the said section, a cap ring adjacent the other end of said casing, a guard plate carried by the inner face of said removable sections and having guide-ways therein, a bolt slidably mounted through said casing, tumblers transversely slidable within said casing and within said guide-ways and opening, normally projecting means for said tumblers, outer and inner rings journaled upon said casing between the said top and bottom rings, said outer rings provided with sockets on their inner sides and having openings through the rings communicating with the said sockets, springs within said sockets having one of their ends secured to the ring, push pins mounted upon the other ends of said springs and extending through said openings of the said rings.

In testimony whereof I affix my signature in the presence of two witnesses.

ALEXANDER LEKSUCZIN.

Witnesses:
  MICHIEL KULWICKI,
  STANISLAW FLOVCZAK.